United States Patent [19]

Duncan

[11] Patent Number: 5,299,591
[45] Date of Patent: Apr. 5, 1994

[54] DEVICE FOR CONTAINING LEAKS ABOVE SUSPENDED CEILINGS

[76] Inventor: Harry P. Duncan, 74 Valleybrook Dr., Hendersonville, Tenn. 37075

[21] Appl. No.: 1,283

[22] Filed: Jan. 7, 1993

[51] Int. Cl.⁵ .............................................. F16L 5/00
[52] U.S. Cl. ................................. 137/15; 137/312; 137/357
[58] Field of Search .................... 137/312, 15, 357

[56] References Cited

U.S. PATENT DOCUMENTS

| | | | |
|---|---|---|---|
| 4,245,666 | 1/1981 | Norris | 137/357 |
| 4,633,899 | 1/1987 | Lord | 137/312 |
| 5,172,718 | 12/1992 | Thornburgh | 137/312 |

Primary Examiner—A. Michael Chambers
Attorney, Agent, or Firm—Rick R. Wascher

[57] ABSTRACT

A device for collecting fluid accumulating above a suspended ceiling. The invention comprising a receptacle for collecting the fluid, a hose for redirecting the fluid and a connection means to couple the receptacle and hose and to operative engagement with one another. The receptacle is formed from a contiguous wall forming an interior well portion and terminating in a drain. The upper portion of the receptacle is bounded by a rim. A flange portion is associated with at least two opposing sides of the receptacle. The receptacle is installed on the grid structure of a suspended ceiling by first removing a removable ceiling tile from the grid structure and placing the inventive receptacle into operative engagement with the grid structure. The flange rests on the platform of the grid structure provided for support of the ceiling tiles. An optional safety member can be attached to the rim of the receptacle and engage the grid structure to prevent the inadvertent withdrawal of the receptacle from its installed position. In use, fluid entering the receptacle is allowed to travel along the inwardly and downwardly directed contours of the walls forming the interior of the well allowing the fluid to exit the receptacle via the drain. A fluid conduit connected to the drain redirects the fluid in a fashion selected by the user.

20 Claims, 1 Drawing Sheet

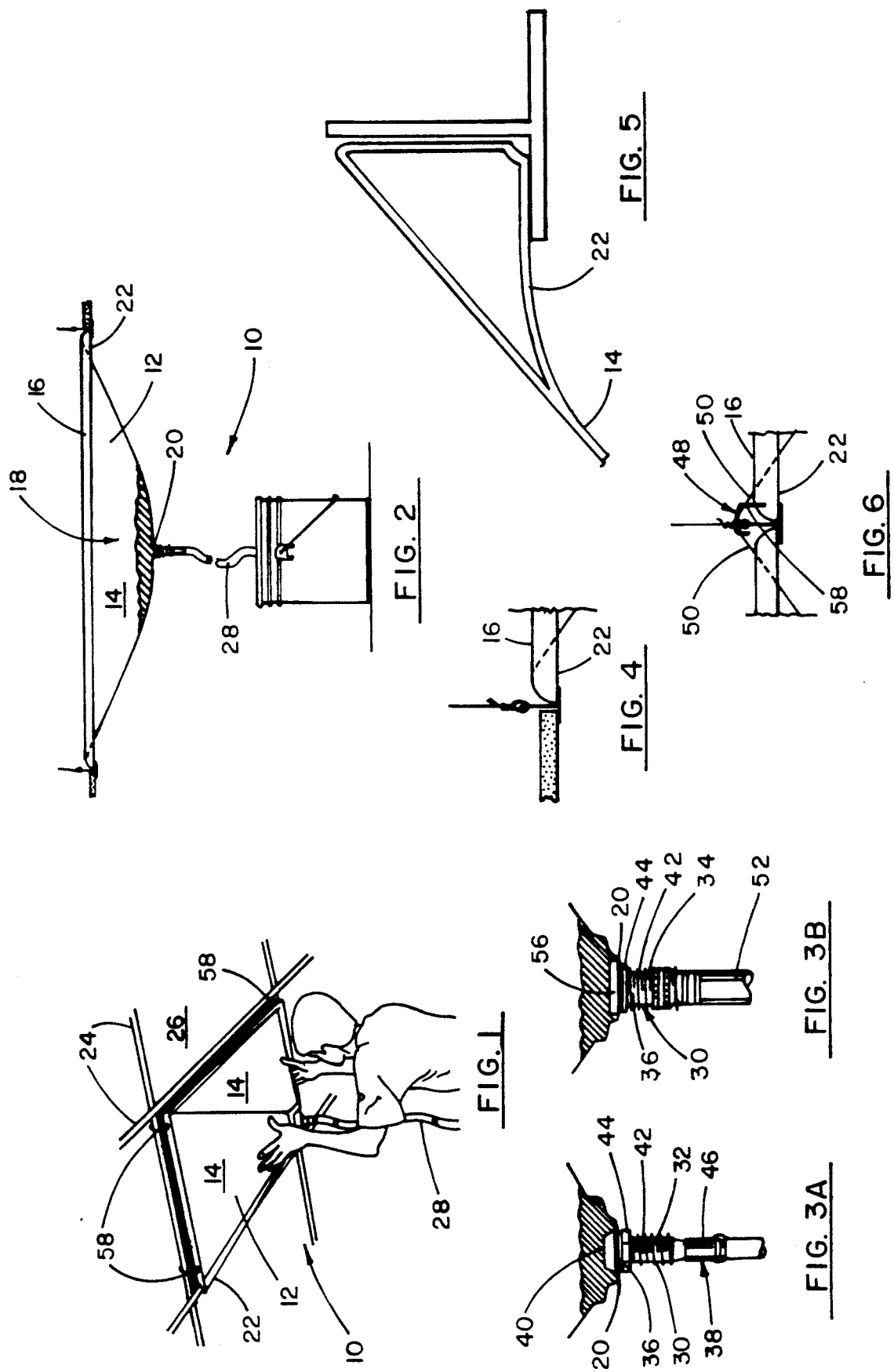

DEVICE FOR CONTAINING LEAKS ABOVE SUSPENDED CEILINGS

BACKGROUND OF THE INVENTION

The invention relates generally to devices for catching and redirecting fluid from a leaking ceiling, but more particularly to devices for catching and redirecting fluids which would otherwise be allowed to pool above suspended ceilings. The source of the fluid, for example, could be rain water entering a building structure through a leaking roof or wall, faulty plumbing, or the like, situated above a suspended ceiling.

In the case of a leaky roof it is quite common for water or other fluids to enter the building structure through a crack, aperture, or other breach in the structural boundary. In the residential setting the unwanted fluid is usually water.

In the case of leaking fluid containing pipes, particularly in the commercial or industrial setting, the fluid could be oil, brine, or other fluids more difficult to clean up than water.

By way of example, water entering a building structure through a leak in the roof may either trickle down the the underside of the roof, down the walls and pool on the ceiling, or simply flow to the ceiling immediately below the leak.

In the vast majority of cases, the water or other fluid that has accumulated on a ceiling either seeps through the ceiling panel or flows to the panel boundary and over the edge of the ceiling panel causing it to flow into the living or work spaces of the structure.

Fluid entering the living or work space of the structure often comes into contact with the contents of the structure, such as furniture, manufactured goods, works of art, inventory, etc. Unfortunately, in many of these instances the contents of the structure are irreparably damaged or destroyed by the unwanted fluid.

In fact, untold thousands of dollars are lost each year throughout the country and worldwide due to water damage. These figures escalate when consideration is given to damage done by leaks of other fluids such as oil and the like.

Prevention of leaks and seepage is almost impossible, because the occupants of the living or work space are often unaware of the accumulation of fluid overhead on the ceiling. While the fluid is contained to the space above the ceiling, it is likely that fluid damage will be minimal.

When an occupant of the living or work space becomes aware of the existence of fluid above the ceiling, usually after the fluid enters the living or work space, the occupants must deal with the problem of collecting the unwanted fluid so as to prevent further damage or dangerous conditions such as slippery floors.

In addition to the placement of a bucket under the fluid entry point, there have been a number of prior art systems developed to catch and redirect unwanted fluid entering a living or work space through the ceiling.

U.S. Pat. No. 4,633,899 (the '899 device) is directed to a device for providing a temporary remedy for ceiling leaks. The '899 device comprises a flexible sheet of plastic having attachment loops at the periphery of the sheet. The loops provide a means for fastening hooks to the sheet. The hooks (and sheet) are then taped to the living or work space side of the ceiling and allowed to catch the incoming fluid.

A hole is formed in the central portion of the sheet. The sheet is allowed to sag and permit the hole to function as a drain. A flexible hose may be connected to the drain and allow the fluid to be redirected by the hose.

U.S. Pat. No. 4,245,666 (the '666 patent) is directed to a collecting device for ceiling leaks. The '666 device comprises a stand portion and a fluid receptacle portion situated atop the stand. A flexible hose is connected to the drain at the base of the fluid receptacle.

In use, the receptacle and stand combination are placed immediately below the area of the ceiling having the leak. A telescoping extension of the stand enables the fluid receptacle portion to be elevated to a position nearer the fluid flow position. Water entering the fluid receptacle is able to exit the receptacle via the drain and be redirected by the flexible hose.

U.S. Pat. Nos. 4,903,723, 4,889,155, and 3,003,666 are devices designed to catch fluid escaping from either a structure or a machine, but are not designed to catch fluid entering a living or work space through a ceiling.

Accordingly, there exists a need for a fluid collection device which is lightweight, durable, easy to install, and is engagable with the supporting structure of a ceiling, such as a suspended ceiling having removable panels. The present invention addresses this need.

SUMMARY OF THE PRESENT INVENTION

The present invention comprises a portable receptacle for trapping and redirecting fluid that would normally accumulate above the ceiling of a building structure. The unwanted fluid may originate from a leak in the roof, from faulty plumbing, etc. The receptacle has a fluid retaining well portion terminating in a lower drain. Fluid entering the well portion of the receptacle is allowed to travel to the lowermost depth of the receptacle due to the inwardly and downwardly sloping side wall(s) of the receptacle. The fluid is allowed to exit the receptacle via the drain. The receptacle may be hemispherical, polygonal, rectangular or virtually any geometric shape capable of catching fluid.

A flexible hose is attachable to the receptacle at the drain opening. The engagement between the hose and receptacle is either through a coupling such as a collared threaded fitting or simply by an exit tube formed in the receptacle below the drain.

In the case of a fitting, the collar portion of the fitting engages the opening of the drain from the interior and prevents the fitting from being pulled through the drain by the weight of the hose. The threaded portion protrudes from the drain below the receptacle.

An optional locking nut can be screwed onto the threaded portion up against the exterior of the drain to hold the fitting securely in place. The hose is then attached to the fitting by slipping it over the still protruding portion, or in the case of a garden hose having a rotatable connector, by threading the hose onto the fitting.

In an alternate embodiment of the present invention which will be described below, the hose engaging portion of the fitting may simply be a tapered or smooth cylindrical portion over which the hose is slipped. The cylindrical tube may or may not have a retaining collar to expand the inside diameter of the hose in an attempt to resist pull-off of the hose from the fitting.

As alluded to above, the drain portion of the receptacle may be formed with an integral exit tube such that the flexible hose can be slipped over the protruding portion of the receptacle. In this fashion a fitting element is unnecessary and therefore with respect to the invention is optional.

Either the fitting or the drain portion of the receptacle may have an optional strainer or screen to prevent roofing material, rust, insulation, and other materials commonly found above suspended ceilings from getting washed into the receptacle by the fluid flow and eventually clog the hose. That is, the smaller particles of a size to flow through the screen and hose are expelled from the well of the receptacle, but the larger potentially clogging particles are prevented from entering the hose and clogging it.

The entire system, receptacle, drain fitting and hose are removably engagable as a unit with the framework of a suspended ceiling structure. Commonly, such suspended framework has a T-shape cross section. Support members hold the frame in place. The cross members of the T shape provide a shelf upon which the ceiling panels rest.

The receptacle has a rim which surrounds at least two sides of the receptacle. The dimensions of the receptacles vary in accordance with the size of the ceiling panel space they will occupy. Generally, the most common sizes of receptacles are the standard 2'×2' and 2'×4', but virtually any size receptacle sized to fit a particular ceiling space (e.g. round, rectangular, etc.) may be used in accordance with the principles of the present invention.

Accordingly, the rim will rest upon the flanges of the grid in much the same fashion as the ceiling panel removed therefrom. Of course, the rim of the receptacle may completely surround the edges of the receptacle such that greater load dispersion and support are provided.

In addition to the optional fitting member, an optional grid cover or deflector may be used to shield the interface between the rim of the receptacle and suspended ceiling grid structure. The deflector has a fluid run-off portion and a grid overlying portion and may have a V-shaped cross-section, or planar cross-section. Preferably the grid overlying portion of the deflector provides attachment of the deflector to the grid, but such an arrangement is not mandatory for effective operation of the deflector.

V-shaped deflectors are particularly useful when multiple receptacles are positioned adjacent one another and when used in combination. In this way, a single deflector can overlap the grid sandwiched between the rims of adjacent receptacles, and thereby direct the fluid flow into either receptacle depending upon the side of the deflector the fluid impinges.

BRIEF DESCRIPTION OF THE DRAWINGS

FIG. 1 is a perspective view of the present invention shown about to be installed in a suspended ceiling by the user.

FIG. 2 is a partial sectional view of the inventive system and shown in the installed fluid collecting position.

FIG. 3A is an enlarged partial sectional view of the fitting member in its engagement with the receptacle and flexible hose components of the invention.

FIG. 3B is an enlarged partial sectional view of the fitting member in its engagement with the receptacle and flexible hose components of the invention.

FIG. 4 is a representational view of one embodiment of the flange portion of the present invention shown in its installed position.

FIG. 5 is a representational view of an alternate embodiment of the rim portion of the present invention shown in its installed position.

FIG. 6 is a representational view of a pair of collection receptacles whose rim portions are adjacent one another and supported by the grid assembly. A deflector member is also shown in this figure.

DESCRIPTION OF THE PREFERRED EMBODIMENT

The fluid receptacle assembly of the present invention is designated generally with reference numeral 10, and the inventive receptacle is designated by the reference numeral 12.

In the preferred embodiment of the invention the receptacle 12 has hemispherically shaped side wall 14. In an alternate embodiment of the invention the side walls 14 are contiguous and trapezoidal in shape. Irrespective of the shape of the wall 14, the walls are angled in a direction below and away from the imaginary horizontal plane formed by the rim 16.

The side walls 14 form a well portion 18 which terminates in a drain opening 20. A flange portion 22 is preferably formed on the exterior of the receptacle 12, and is provided to support the receptacle on the ceiling grid 24 in a manner similar to ceiling panels 26 (FIG. 5).

Of course, the placement of flange 22 and rim 16 with respect to the receptacle may coincide and function as one piece of structure. Accordingly, rim 16 simply defines the upper boundary of the well portion 18.

Hose 28 allows the user to redirect the flow of water collected and discharged from the well portion 18 of the receptacle 12. Connection means 30 enables the hose member 14 to be removably attached to the receptacle 12, and may be a tubular portion (not shown) formed integral with and protruding from the receptacle.

In the preferred embodiments of the invention, however, the connection means comprises a fitting member 32 or 34. Fittings 32 and 34 have a receptacle engaging end 36 and a hose engaging end 38.

Fitting embodiment 32 as shown in FIG. 3, is comprised of a raised collar portion 40, a threaded neck 42, having a locking nut 44 threadable thereon, and terminating in a smooth cylindrical portion 46. The collar 40 is preferably larger than the diameter of the drain opening 20 and is formed of a metallic or suitable high strength polymeric, vinyl, TEFLON, plastic or other material such that inadvertent withdrawal of the collar from the drain after installation is prevented.

Of course, it is possible to form the collar portion 40 from a pliable material such that it may be introduced into the well 18 from the exterior of the receptacle 12 through the drain 20, but this is not the preferred means because the potential for pullout of the fitting is greater than a rigid or semi-rigid fitting inserted through the well of the receptacle.

After the fitting is installed, locking nut 44 is then threadable along the threaded neck 42 to contact the exterior surface of the receptacle 12 below the drain 20, securing the fitting in its installed position.

In use, (see FIG. 1) the user simply removes a ceiling panel 26 (shown having a rectangular shape but may have virtually any shape), which is located directly below the leak or area where the fluid first attempts to pool and installs the appropriately sized receptacle 12 into the resultant opening.

Flange 22 rests on the ceiling grid 24 in much the same fashion as a ceiling panel. If the user so desires, the user main place deflector members 48 over the grid structure 24 enabling the angled surface 50 to direct fluid down into the well portion of the receptacle.

If a flexible hose 28 is not already connected to the receptacle 12 and/or fitting 32, the user simply connects a flexible hose to the hose engaging portion of the connection means.

In an alternate embodiment of the fitting of the inventive system, a conventional garden hose 52 having a rotatable and interiorly threaded (not shown) collar 54 can be threaded to the neck portion 42 of the fitting.

In the preferred embodiments of the invention the receptacle 12 and hose 28 are preferably made from a transparent or semi-transparent material to enable the user to carefully monitor the fluid flow into the well portion and out through the hose member. This is particularly important when one considers that an amount of debris could enter the receptacle and potentially clog the drain and/or the hose.

Accordingly, a strainer member 56 can be placed into the well portion 18 and over the drain portion 20 of the receptacle 12 to skim off the large potentially clogging debris particles (not shown) and allow the smaller particles (not shown) to pass through the strainer grid (not shown) and exit the drain via the hose. The strainer is preferably formed of a mesh-like material, having a mesh spacing suitable for a particular fluid flow, size of drain opening which may, and degree of filtration level.

Consideration has been given to the possibility of the receptacle becoming dislodged from it installed position. To minimize this possibility safety members 58 are used in conjunction with the receptacle. The safety members are designed to engage both the receptacle and grid structure. In the unlikely event the receptacle is dislodged, the safety members minimize the possibility of the receptacle falling from the ceiling.

The safety members 58 can be lengths of wire or cord and function as lanyards, or may be a clip means to fasten the receptacle to the grid when installed.

As this invention may be embodied in several forms without departing from the spirit or essential characteristics thereof, the present embodiment is therefore, illustrative and not restrictive, since the scope of the invention is defined by the appended claims rather than by the description preceding them, and all changes that fall within the meets and bounds of the claims or that form their functional as well as conjointly cooperative equivalents are, therefore, intended to be embraced by those claims.

What is claimed is:

1. A method of collecting and redirecting fluid collected above a suspended ceiling structure having a grid for supporting removable ceiling panels, comprising the steps of:
   selecting a receptacle means sized to be inserted an opening in a suspended ceiling after a ceiling panel is removed therefrom for collecting fluid,
   said receptacle means having a contiguous side wall portion, a well portion having a rim defined by said side wall portion, a drain contained within said well portion, and a flange means for supporting said receptacle in an operable position,
   installing said receptacle means into operative engagement with said grid structure of said suspended ceiling at a position enabling the fluid to enter said well portion of said receptacle means and exit said drain.

2. The method of claim 1 further comprising the step of: attaching a fluid conduit means into operative engagement with said receptacle means for redirecting fluid exiting from said receptacle means via said drain.

3. The method of claim 1 further comprising the steps of:
   installing a strainer means into said well portion of said receptacle means for filtering the fluid exiting said receptacle means via said drain.

4. The method step of claim 2 wherein said operative engagement includes the step of:
   installing a connection means for removably attaching said fluid conduit means interoperatively between said fluid conduit means and said receptacle means enabling said fluid conduit means to be selectively connected and disconnected from said connection means.

5. The method step of claim 2 wherein said operative engagement includes the step of:
   installing a connection means for removably attaching said fluid conduit means interoperatively between said fluid conduit means and said receptacle means enabling said fluid conduit means to be selectively connected and disconnected from said receptacle means.

6. An apparatus for catching fluid released above a suspended ceiling structure, said apparatus comprising:
   a receptacle means for collecting fluid,
   said receptacle means having a contiguous wall portion and a well portion having a rim defined by said wall, a drain contained within said well portion and a flange means for supporting said receptacle in an operable position on the suspended ceiling structure to suspend said receptacle therefrom.

7. The apparatus of claim 6 further comprising:
   a fluid conduit means, having a fluid entry end and a fluid discharge end, for transmitting collected fluid, and
   connection means for attaching said fluid conduit means to said receptacle means.

8. The apparatus of claim 7 wherein said fluid conduit means comprises:
   a flexible hose.

9. The apparatus of claim 7 wherein said connection means further comprises:
   fitting means having a receptacle means engaging portion and a fluid conduit means engaging portion for operatively attaching said fluid conduit means to said receptacle means.

10. The fitting means of claim 9 wherein:
    said receptacle means engaging portion is a collar insertable into said well portion of said receptacle means via said drain.

11. The fitting means of claim 9 wherein:
    said fluid conduit means engaging portion is a cylinder having a surface configuration enabling the inadvertent withdrawal of said fluid conduit means from said receptacle means to be minimized.

12. The apparatus of claim 6 further comprising:
    a deflector means for directing fluid over said rim portion of said well portion of said receptacle means.

13. A system for collecting and redirecting fluid collected above a suspended ceiling structure having a grid for supporting removable ceiling panels, comprising:
    a receptacle means for collecting fluid,
    a drain associated with said receptacle means, a fluid conduit means, operatively connected to said drain, for transmitting fluid from said receptacle means, and flange means associated with said receptacle means for operative engagement of sad receptacle with said grid of said ceiling structure to suspend said receptacle means therefrom.

14. The system of claim 13 further comprising:

a fluid reservoir means for receiving fluid transmitted by said fluid conduit means.

15. The system of claim 13 further comprising:

a strainer means for filtering the fluid entering said fluid conduit means.

16. The system of claim 13 further comprising:

a deflector means for directing said fluid collecting above a suspended ceiling into said receptacle means.

17. The guard means of claim 16 comprising:

at least one deflector portion and a grid foldover portion wherein said deflector portion is angled downward in a direction into said well portion and said grid foldover portion overlies said grid portion of a suspended ceiling.

18. The system of claim 13 wherein said operative connection of said fluid conduit means and said receptacle means includes:

connection means having a receptacle means engaging portion and a fluid conduit means engaging portion.

19. The connection means of claim 18 further comprising:

a fitting means for interpositional engagement of said fluid conduit means and said receptacle means.

20. The fluid conduit means of claim 13 further comprising:

a flexible hose.

* * * * *